US009523285B2

(12) United States Patent
Heiligenstein et al.

(10) Patent No.: US 9,523,285 B2
(45) Date of Patent: Dec. 20, 2016

(54) ENERGY STORAGE SYSTEMS WITH MEDIUM VOLTAGE ELECTRICAL HEAT EXCHANGERS

(71) Applicant: Chromalox, Inc., Pittsburgh, PA (US)

(72) Inventors: Adam Heiligenstein, Gibsonia, PA (US); Mark Wheeler, Butler, PA (US); Christopher Molnar, Moon Township, PA (US)

(73) Assignee: CHROMALOX, INC., Pittsburgh, PA (US)

( * ) Notice: Subject to any disclaimer, the term of this patent is extended or adjusted under 35 U.S.C. 154(b) by 432 days.

(21) Appl. No.: 14/105,951

(22) Filed: Dec. 13, 2013

(65) Prior Publication Data

US 2015/0167489 A1    Jun. 18, 2015

(51) Int. Cl.
| | |
|---|---|
| *F01D 15/10* | (2006.01) |
| *F01K 3/18* | (2006.01) |
| *F02C 6/16* | (2006.01) |
| *F28D 20/00* | (2006.01) |
| *H02J 3/28* | (2006.01) |
| *H02J 15/00* | (2006.01) |

(Continued)

(52) U.S. Cl.
CPC ............... *F01D 15/10* (2013.01); *F01K 3/186* (2013.01); *F01K 5/02* (2013.01); *F02C 6/16* (2013.01); *F28D 20/00* (2013.01); *H02J 3/28* (2013.01); *H02J 15/00* (2013.01); *H05B 3/50* (2013.01); *F05D 2260/42* (2013.01); *Y02E 60/142* (2013.01); *Y02E 60/15* (2013.01); *Y02E 70/30* (2013.01)

(58) Field of Classification Search
CPC ............... F03G 6/005; F02C 3/36; F02C 7/10; F03D 9/02; F03D 9/00; H05B 3/06; H05B 3/02; H05B 3/44; H01C 17/02
See application file for complete search history.

(56) References Cited

U.S. PATENT DOCUMENTS

| | | | |
|---|---|---|---|
| 4,934,831 | A | 6/1990 | Volbrecht |
| 5,072,093 | A | 12/1991 | Scheuerer |

(Continued)

FOREIGN PATENT DOCUMENTS

| | | |
|---|---|---|
| DE | 102011080830 A1 | 2/2013 |
| EP | 1577549 A1 | 9/2005 |

(Continued)

OTHER PUBLICATIONS

International Search Report and Written Opinion for PCT/US2014/067065 dated Mar. 19, 2015 (9 pages).

*Primary Examiner* — Thomas Denion
*Assistant Examiner* — Shafiq Mian
(74) *Attorney, Agent, or Firm* — K&L Gates LLP (57) ABSTRACT

Energy storage systems and methods use medium voltage (MV) electrical heat exchangers to increase the efficiency of the energy storage system and/or reduce emission of pollutants. MV electrical heat exchangers use medium range voltages to heat a fluid, such as a gas or liquid. The heated fluid is used in the energy storage system to either drive a turbine generator directly or indirectly, such as by generating steam to drive the turbine generator. The electricity used to power the MV electrical heat exchangers can be from renewable energy sources, such as solar or wind-powered sources, further increasing efficiency of the energy storage system.

29 Claims, 8 Drawing Sheets

(51) Int. Cl.
*F01K 5/02* (2006.01)
*H05B 3/50* (2006.01)

(56) References Cited

U.S. PATENT DOCUMENTS

| | | | |
|---|---|---|---|
| 5,097,100 A | 3/1992 | Jackson | |
| 5,218,185 A | 6/1993 | Gross | |
| 5,401,937 A * | 3/1995 | Nagano | H05B 3/48 219/544 |
| 5,486,682 A * | 1/1996 | Rysemus | H05B 3/48 219/542 |
| 5,536,478 A | 7/1996 | Lipp et al. | |
| 5,558,794 A | 9/1996 | Jansens | |
| 5,811,761 A | 9/1998 | Kita et al. | |
| 6,002,117 A | 12/1999 | Pak | |
| 6,137,084 A | 10/2000 | Thomas | |
| 6,160,246 A * | 12/2000 | Rock | D04B 1/04 219/529 |
| 6,172,345 B1 * | 1/2001 | Dial | H05B 3/44 219/544 |
| 6,188,051 B1 * | 2/2001 | Kusek | H05B 3/10 219/544 |
| 6,373,034 B1 | 4/2002 | Rock et al. | |
| 6,414,286 B2 | 7/2002 | Rock et al. | |
| 6,459,074 B1 * | 10/2002 | Michelbach | H02G 15/18 219/541 |
| 6,501,055 B2 | 12/2002 | Rock et al. | |
| 6,781,081 B2 | 8/2004 | Groos et al. | |
| 6,835,913 B2 | 12/2004 | Duncan et al. | |
| 7,086,231 B2 | 8/2006 | Pinkerton | |
| 7,180,037 B2 | 2/2007 | Weiss | |
| 7,372,007 B1 | 5/2008 | McClanahan et al. | |
| 8,261,552 B2 | 9/2012 | Nakhamkin | |
| 9,301,341 B2 * | 3/2016 | Riley | H05B 3/06 |
| 2007/0108176 A1 * | 5/2007 | Ellis | F16L 53/008 219/228 |
| 2008/0251511 A1 | 10/2008 | Lee | |
| 2010/0200569 A1 * | 8/2010 | Base | H05B 3/50 219/550 |
| 2011/0016864 A1 | 1/2011 | Wright et al. | |
| 2011/0067398 A1 | 3/2011 | Slocum et al. | |
| 2011/0131989 A1 | 6/2011 | Sampson et al. | |
| 2011/0137480 A1 | 6/2011 | Sampson et al. | |
| 2011/0197831 A1 | 8/2011 | Ohyatsu et al. | |
| 2012/0085749 A1 | 4/2012 | Wheeler | |
| 2012/0167559 A1 | 7/2012 | Havel | |
| 2012/0186252 A1 | 7/2012 | Schmidt | |
| 2013/0081394 A1 * | 4/2013 | Perry | F03G 6/005 60/641.8 |
| 2013/0206134 A1 | 8/2013 | O'Donnell et al. | |
| 2013/0232974 A1 | 9/2013 | Nakhamkin | |
| 2013/0240068 A1 | 9/2013 | Samara-Rubio et al. | |
| 2013/0257056 A1 | 10/2013 | Ma | |
| 2013/0298557 A1 | 11/2013 | Treece et al. | |
| 2014/0263282 A1 | 9/2014 | Riley et al. | |

FOREIGN PATENT DOCUMENTS

| | | |
|---|---|---|
| EP | 2574756 A1 | 4/2013 |
| EP | 2574784 A2 | 4/2013 |
| EP | 2657466 A2 | 10/2013 |
| WO | WO 2013/006630 A2 | 1/2013 |

* cited by examiner

ENERGY STORAGE SYSTEMS WITH MEDIUM VOLTAGE ELECTRICAL HEAT EXCHANGERS

BACKGROUND

The growth of renewable energy sources is driving the need for new technologies to store electricity due to the random nature of the availability of renewable power. For example, it is not always sunny or windy; conversely, it may be sunny or windy when added power it not needed on the power grid. There are currently a number of techniques for storing electricity for later user. These energy storage systems include: mechanical storage of energy via compressed air or flywheel; electrical storage using super capacitors or superconducting energy magnets; electromechanical means such as various battery technologies; chemical storage by producing hydrogen or synthetic natural gas; and thermal storage where energy is either stored as hot water or molten salt, or used to change the phase of a material.

While providing renewable energy benefits, many of the systems are inefficient in various ways and/or have deleterious effects. For example, compressed air energy storage (CAES) systems often use natural gas to heat the compressed air upon decompression, which results in the emission of air pollution in the form of $NO_x$ and $CO_2$. Also, hot water energy systems also often use gas or coal to heat the large quantities of water that is needed to the desired temperature, which are non-renewable energy sources.

SUMMARY

In one general aspect, the present invention is directed to energy storage systems that use medium voltage (MV) electrical heat exchangers to increase the efficiency of the energy storage system and/or reduce emission of pollutants. MV electrical heat exchangers use medium range voltages, i.e., 601 to 69,000 volts, to heat a fluid, such as a gas or liquid. The heated fluid is used in the energy storage system to either drive a turbine generator directly or indirectly, such as by generating steam to drive the turbine generator. MV electrical heat exchangers are advantageous because nearly 100% of the energy produced is absorbed directly by the heated fluid, allowing for very efficient conversion of electricity into heat. Furthermore, the electricity used to power the MV electrical heat exchangers can be from renewable energy sources, such as solar or wind-powered sources, further increasing efficiency of the energy storage system.

FIGURES

Various embodiments of the present invention are described herein by way of example in conjunction with the following figures, wherein.

DESCRIPTION

In one general aspect, the present invention is directed to energy storage systems that use medium voltage (MV) electrical heating systems or heat exchangers (MVHEs). MV heaters are metal-sheathed resistive heating elements that operate at voltages from 601 volts to 69,000 volts, for example. MV heating provides tremendous efficiencies in converting electricity to heat in comparison to traditional low voltage (LV) systems. For example, a LV system operating at 480 VAC and producing 1 megawatt of heat would require of 1200 amps, which would be cost prohibitive. On the other hand, a MV system producing 1 megawatt of heat, but operating at 4160 VAC, would require only approximately 140 amps of power. This lower amperage lowers the overall equipment costs and eliminates the need for large power transformers that would be required to reduce the voltage down to 480 VAC to operate the heaters in a LV system.

Figure 1:
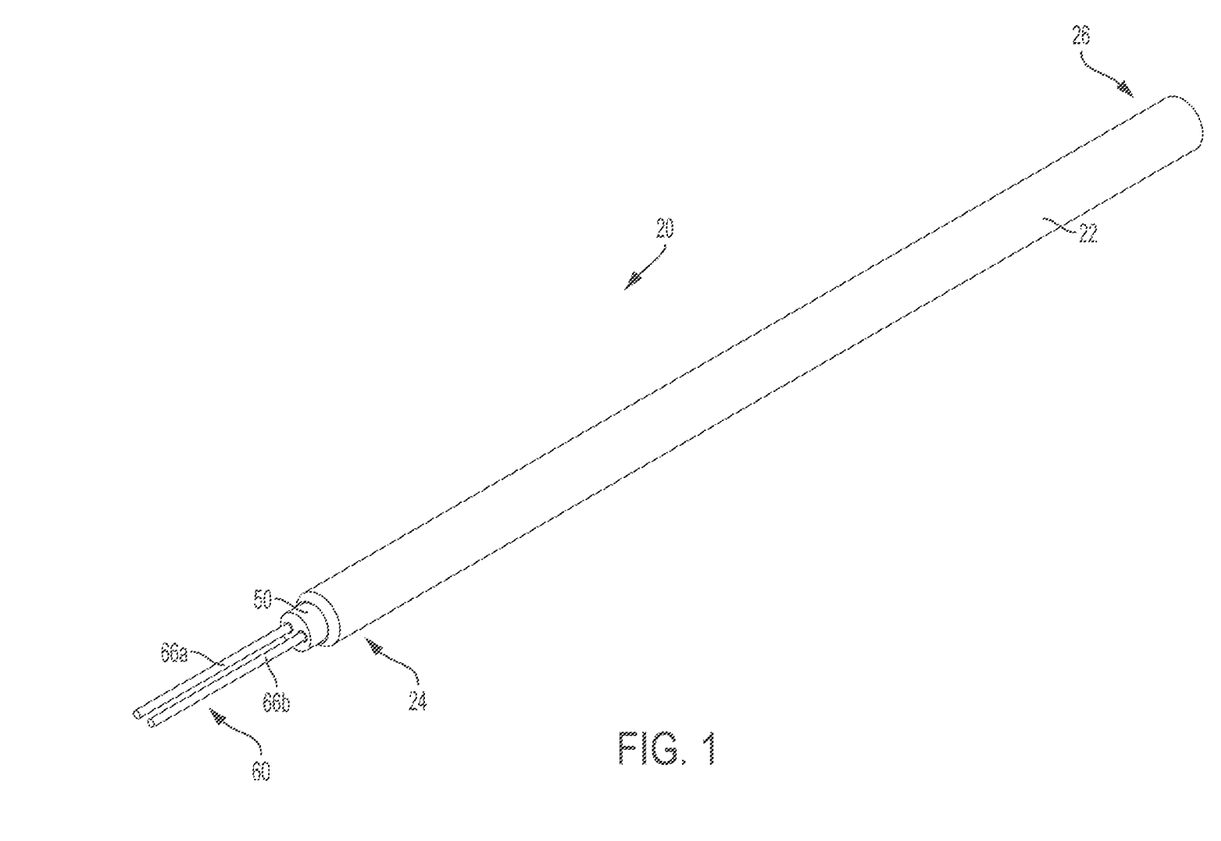
FIGS. 1 and 2 illustrate aspect of a medium voltage resistive heating element according to various embodiments of the present invention.
Figure 2:
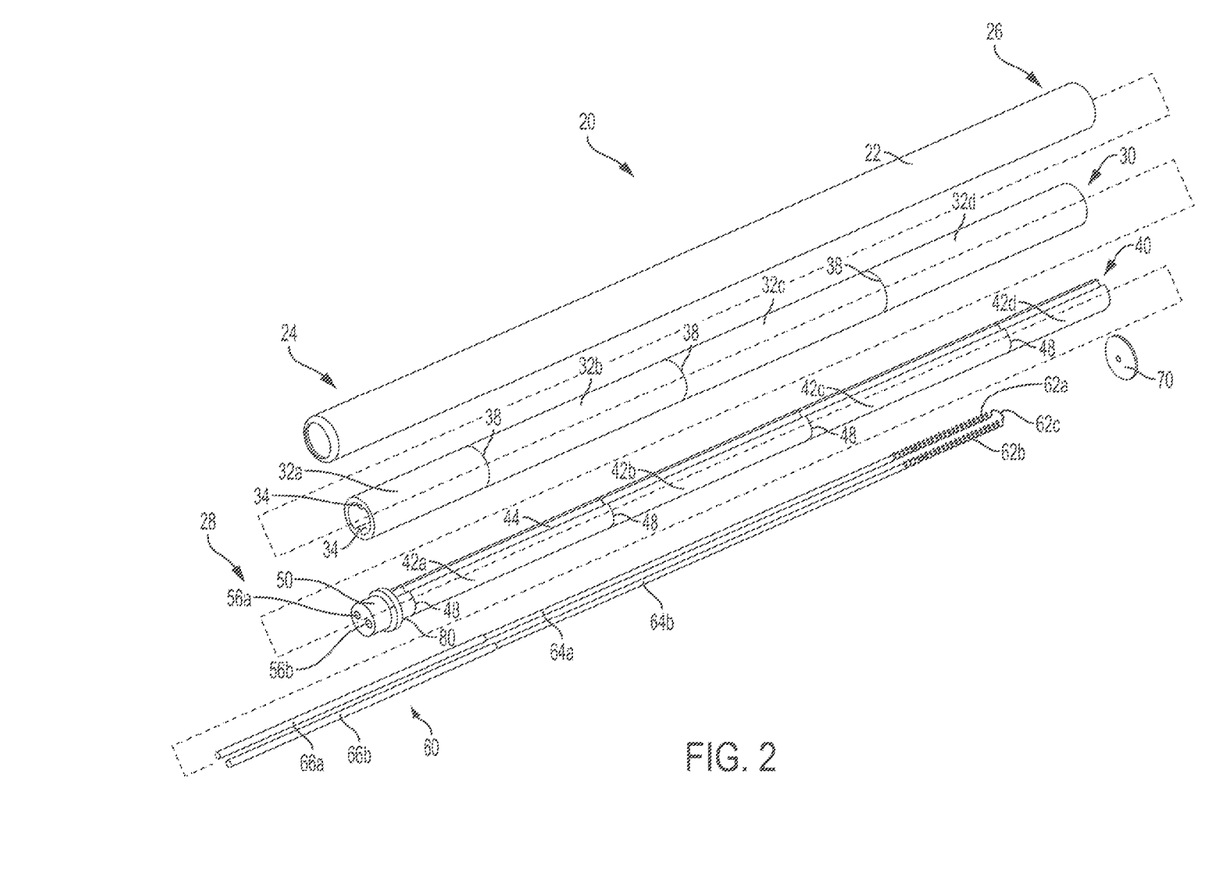

The MVHEs used in the various energy storage systems may comprise one or more MV heating elements. FIGS. 1-2 are diagrams of a MV heating element 20 according to various embodiments. As shown in the example of FIGS. 1 and 2, the MV heating element can include an outer, cylindrical sheath 22 that defines an opening that houses a dielectric core 50 and resistive wires, which inside insulative sleeves 66a, 66b. In various embodiments, the outer sheath 22 can comprise a tube and/or sleeve, for example, which can at least partially encase and/or enclose the heat generating components of the electric heating element assembly 20, i.e., the resistive wires 62a, 62b (see FIG. 2). The outer sheath 22 can be a metallic tube, for example, such as a tube comprised of steel, stainless steel, copper, incoloy, inconel and/or hasteloy, for example. The dielectric core 50 can comprise a dielectric material, such as boron nitride (BN), aluminum oxide (AlO), magnesium oxide (MgO), ceramic material, etc. In various embodiments, multiple nested, staggered core segments can be used to reduce dielectric breakdown and/or arcing. Such MV heater elements are described in U.S. patent application Ser. No. 13/802,842, entitled "Medium Voltage Heating Element Assembly," by Chromalox Inc., filed Mar. 13, 2013 ("the '842 application"), which is incorporated herein by reference in its entirety.

As explained in the '842 application, and as shown in FIG. 2, the insulative sleeves 66a, 66b may surround the heat-generating resistive coils 62a, 62b. The resistive coils 62a, 62b can be connected together by a u-shaped wire 62c at the distal end 26 of the heating element 20. A leadwire (not shown) and/or a conductor pin 64a, 64b can extend from each resistive coil 62a, 62b through the electric heating element assembly 20. The leadwire and/or the conductor pin 64a, 64b can conduct current from a power source to the resistive coil 62a, 62b coupled thereto to generate heat. The power source can supply 601 to 69,000 volts (AC or DC), for example. As also explained in the '482 application and as shown in FIG. 2, the dielectric core 50 may comprise inner and outer annular, staggered core segments 32a-d (outer), 42a-d (inner) to prevent and/or reduce the likelihood of dielectric breakdown and/or arcing at the interfaces between adjacent core segments, for example. As a result, current may be less inclined to attempt to flow through the indirect, stepped path between the inner core 40 and the outer core 30, and thus, the stepped interface formed by the staggered boundaries 38, 48 can prevent and/or reduce the likelihood of dielectric breakdown and/or arc. Furthermore, in various embodiments, the electric heating element assembly 20 can include additional powdered and/or particulate dielectric material within the outer sheath 22. Such dielectric material can settle at the boundaries 38, 48 between various elements of the dual core 28, in faults, voids, and/or cracks of the various dual core 28 elements, and/or between the dual core 28 and various other components of the electric heating element assembly 20, such as, for example, the outer sheath 22, a termination bushing 50, and/or a termination disk 70. In various embodiments, the bushing 50 can prevent and/or reduce the likelihood of arcing between multiple leadwires and/or conductor pins 64a, 64b and the sheath 22.

Further, because moisture that accumulates in MV heating elements can cause failure, MV heating elements that employ a moisture sensor and control the heating element, particularly at start up, based on the detected moisture in the heating element, may be used. One such MV heating element control circuit is disclosed in U.S. patent application Ser. No. 13/866,434, entitled "Medium Voltage Heater Elements Moisture Detection Circuit," by Chromalox Inc., filed Apr. 19, 2013, which is incorporated herein by reference in its entirety.

Figure 3:
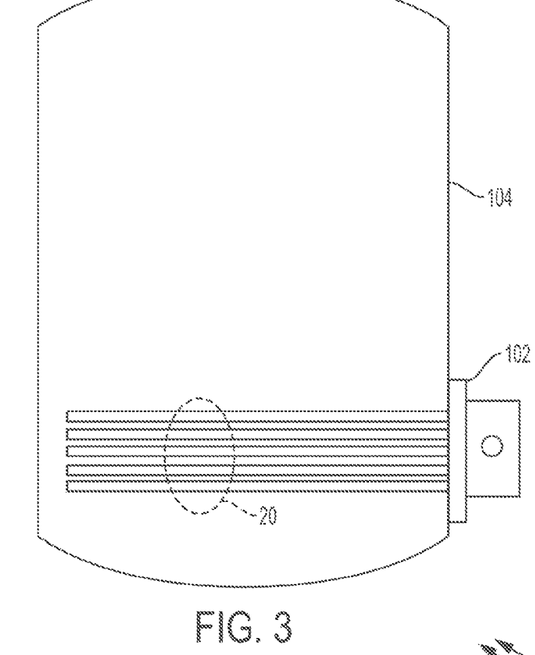
FIGS. 3 and 4 illustrate different medium voltage heat exchangers.
Figure 4:
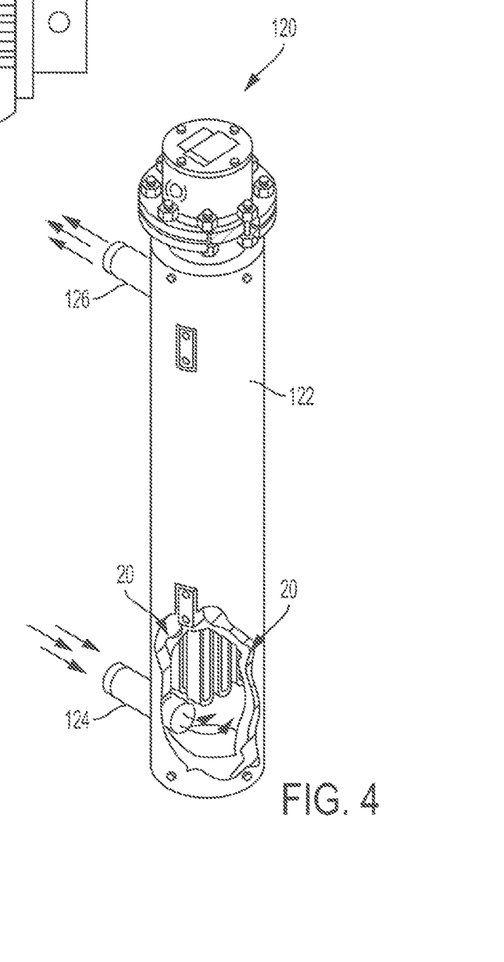

Such MV heating elements 20 can be used in MVHEs that are used in energy storage systems according to various embodiments of the present invention. The MVHE could be, for example, a flanged immersion heater 100 as shown in FIG. 3 or a circulation heater 120 as shown in FIG. 4. The flanged immersion heater 100 comprises one or more MV heating elements 20 connected to a flange 102. The heating elements 20 of the immersion heater 100 can be immersed into the fluid to be heated (gas or liquid) when stored in a storage tank 104. The flange 102 can be connected to a wall of the storage tank 104 so that the heating elements 20 extend into the fluid inside the tank to heat the fluid. A circulation heater 120 as shown in FIG. 4 may include one or more MV heating elements 20 inside a chamber 122. The circulation heater 120 may be connected to (but not immersed in) a storage tank that includes the fluid to be heated. The fluid can flow out of the storage tank, into the chamber 122 of the circulation heater 120 via an inlet pipe 124 to be heated, and then flow out of the circulation heater 120 via an outlet pipe 126 back into the storage tank. The fluid may be pumped continuously through the circulation heater 120 to keep the fluid at the desired temperature.

MVHEs are advantageous to other MV heating technologies as MVHEs can be inserted directly into the heated fluid (e.g., gases, air, water, molten salt, etc.), with nearly 100% of the energy produced being absorbed directly by the fluid, allowing for very efficient conversion of electricity into heat. This enables a smart power grid by allowing the opportunity to store a precise amount of energy from the network at specific times. Such energy storages systems are described below.

Figure 5:
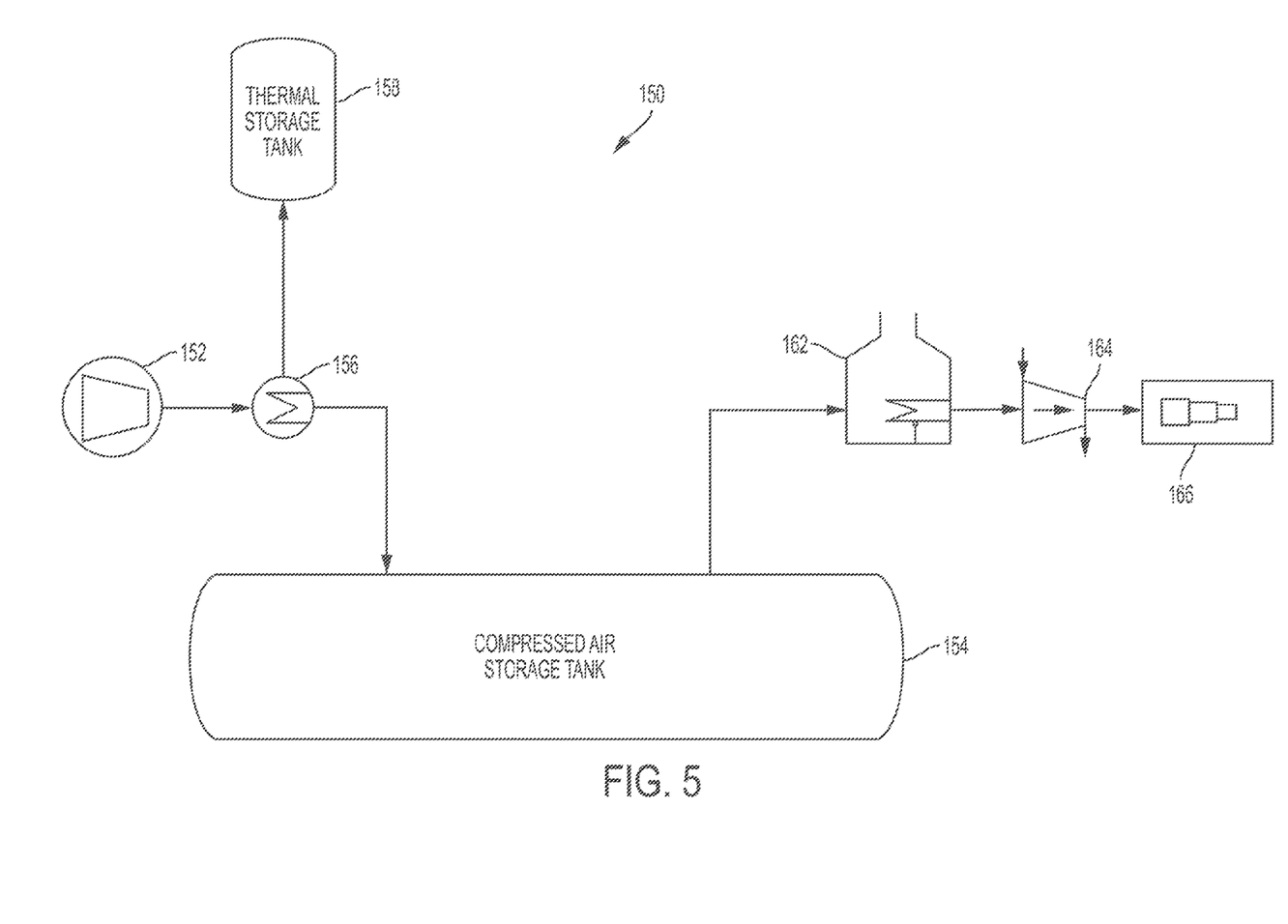
FIG. 5 illustrates a prior art compressed air energy storage system.

FIG. 5 is a simplified block diagram of a known type of compressed air energy storage (CAES) system 150. Air is compressed by a compressor 152 and the compressed air is stored in a storage tank 154. In such systems the storage 154 is usually underground. Also, instead of a tank, some CAES systems utilize underground caverns to store the compressed air. The heat generated by compression of the air by the compressor 152 may be extracted by a heat exchanger 156 to heat a fluid (e.g., gas or liquid) stored in a thermal storage tank 158. The thermal energy from the thermal storage tank 158 could be used to generate electricity when needed. When needed, the compressed air in the storage tank 154 can be used to generate electricity by, in most current CAES systems, heating the compressed air upon decompression with a gas re-heater system 162 to drive a turbine 164 to power a generator 166 to generate electricity that can be supplied to the power grid (not shown). The gas re-heaters 162 typically use natural gas and emit air pollution in the form of NO and $CO_2$.

Figure 6:
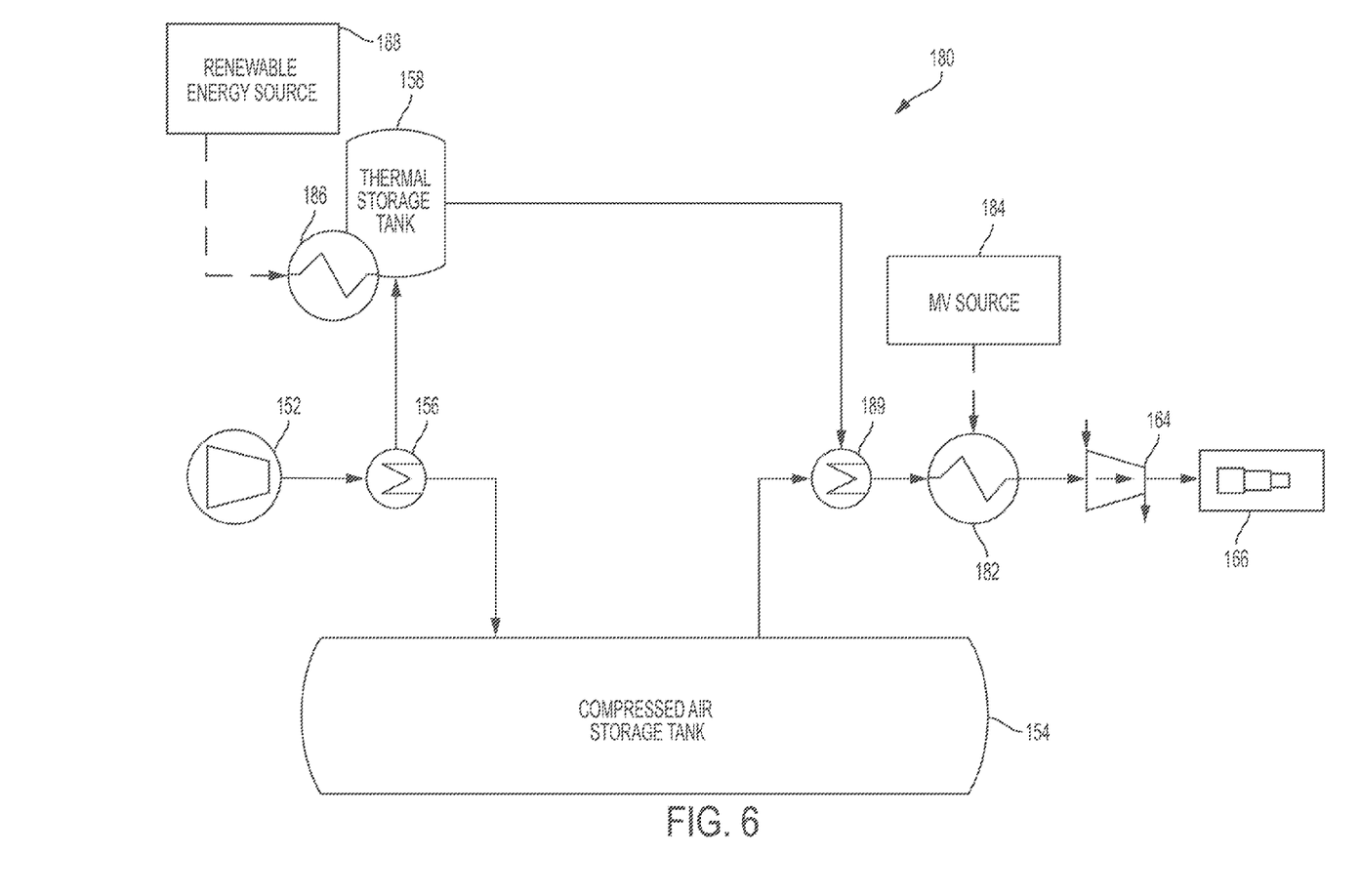
FIG. 6 illustrates a compressed air energy storage system according to various embodiments of the present invention.

FIG. 6 is a block diagram of a CAES system 180 using a MV electrical heat exchanger according to embodiments of the present invention. The CAES system 180 of FIG. 6 is similar to the system 150 of FIG. 5, except that the gas re-heater 162 is FIG. 5 is replaced with a MV electrical heat exchanger 182 in the CAES system 180 of FIG. 6. The MV electrical heat exchanger 182 in such an embodiment could be a circulation heater that heats the decompressed air for driving the turbine 162, and could be powered by a MV source 184 (which could be either AC or DC). Using the MV electrical heat exchanger 182 eliminates the need for the gas re-heater 162 in the CAES system 150 in FIG. 5, and thereby eliminates the air pollution generated by the gas re-heater 162. Also as shown in FIG. 6, another MV electrical heat exchanger 186 may be used to supply additional heat for the fluid in the thermal storage tank. The MV electrical heat exchanger 186 could be implemented as an immersion heater, and could be power by a renewable energy source 188, such as a solar or wind energy source. That way, the thermal energy storage tank 158 could be heated additionally with the heat from the MV electrical heat exchanger 186 at low cost since it is powered by a renewable energy source 188. The heat from the thermal energy storage tank 158 could then be used to reheat the decompressing gasses with a heat exchanger 189.

Figure 7:
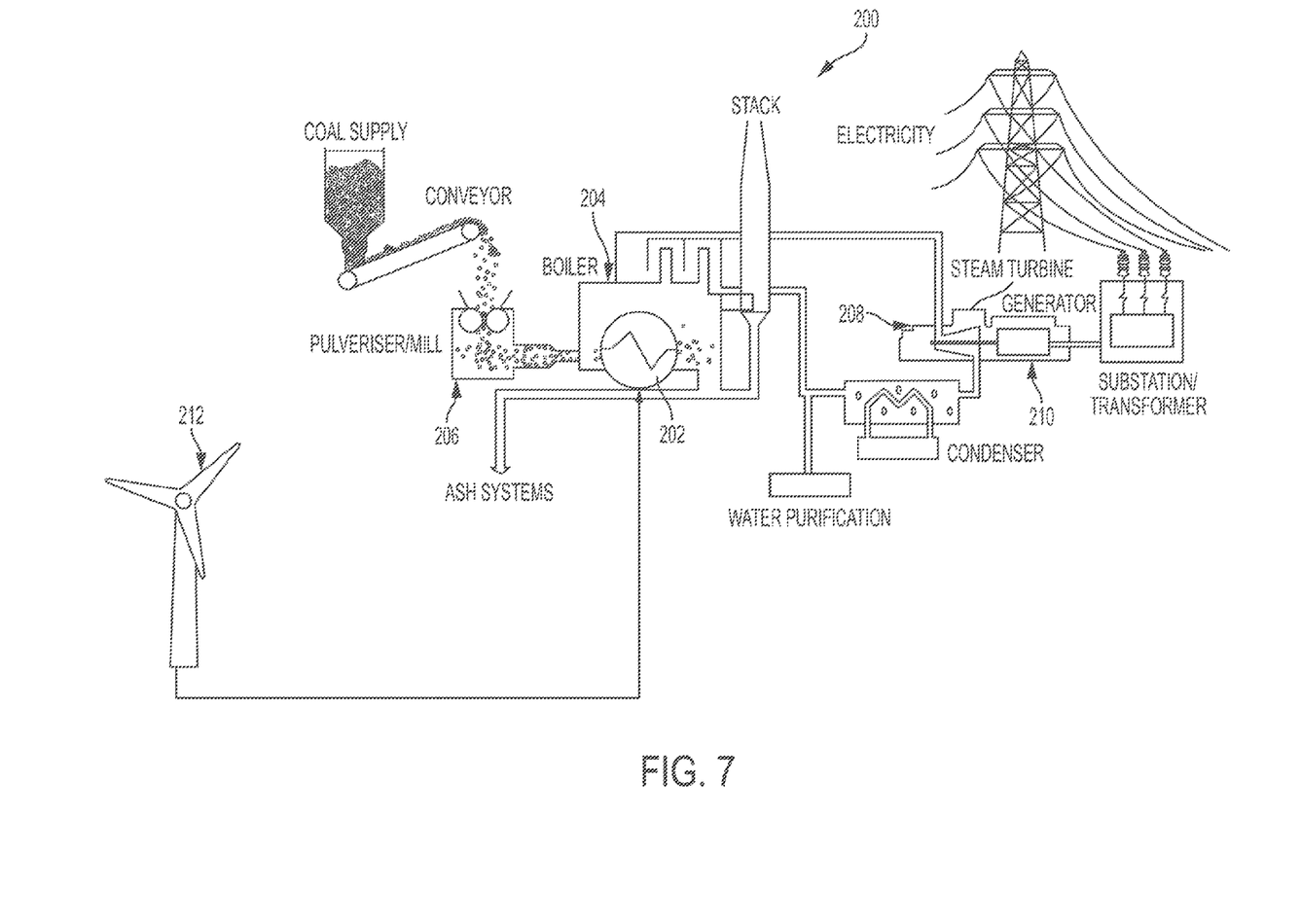
FIG. 7 illustrates a coal-fired energy storage system according to various embodiments of the present invention.

MV heaters could also be used in coal power plants according to various embodiments. Because of decreased demand at night, coal power plants are typically cycled back to far less than full capacity, to about 20%, during the night, which is still more than required by the nighttime demand. The system cannot ordinarily be totally shut down at night because it would not have enough time to ramp up when demand increases in the morning, thereby making operation during the off-peak night hours inefficient. FIG. 7 is a diagram of a coal-power electricity generation plant 200 that utilizes a MV electrical heat exchanger 202 in the plant's pulverized coal-fired boiler 204. The boiler 204 generates thermal energy by burning pulverized coal, from a pulverizer 206. The boiler 204 generates steam to drive a turbine 208, which in turn drives a generator 201 to supply electricity to the power grid. The MV electrical heat exchanger 202 could be powered at night by excess energy on the power grid and/or renewable energy sources (i.e., wind energy) to keep the water in the boiler 204 heated. That way, the coal-heating in the boiler 204 could be reduced even more at night, thereby conserving coal, and with the thermal energy from the MV electrical heat exchanger 202 stored, in the form of the heated water in the boiler, to generate electricity when need in the morning. Such a coal-powered energy system could especially benefit from being located near an under-utilized wind energy power system 212. That way, the excess energy from the wind energy power system could be used to power the MV electrical heat exchanger 202 to thereby reduce the operating capacity of the coal-fired boiler 204. In such an embodiment, the MV electrical heat exchanger 202 may be implemented as an immersion heater.

Figure 8:
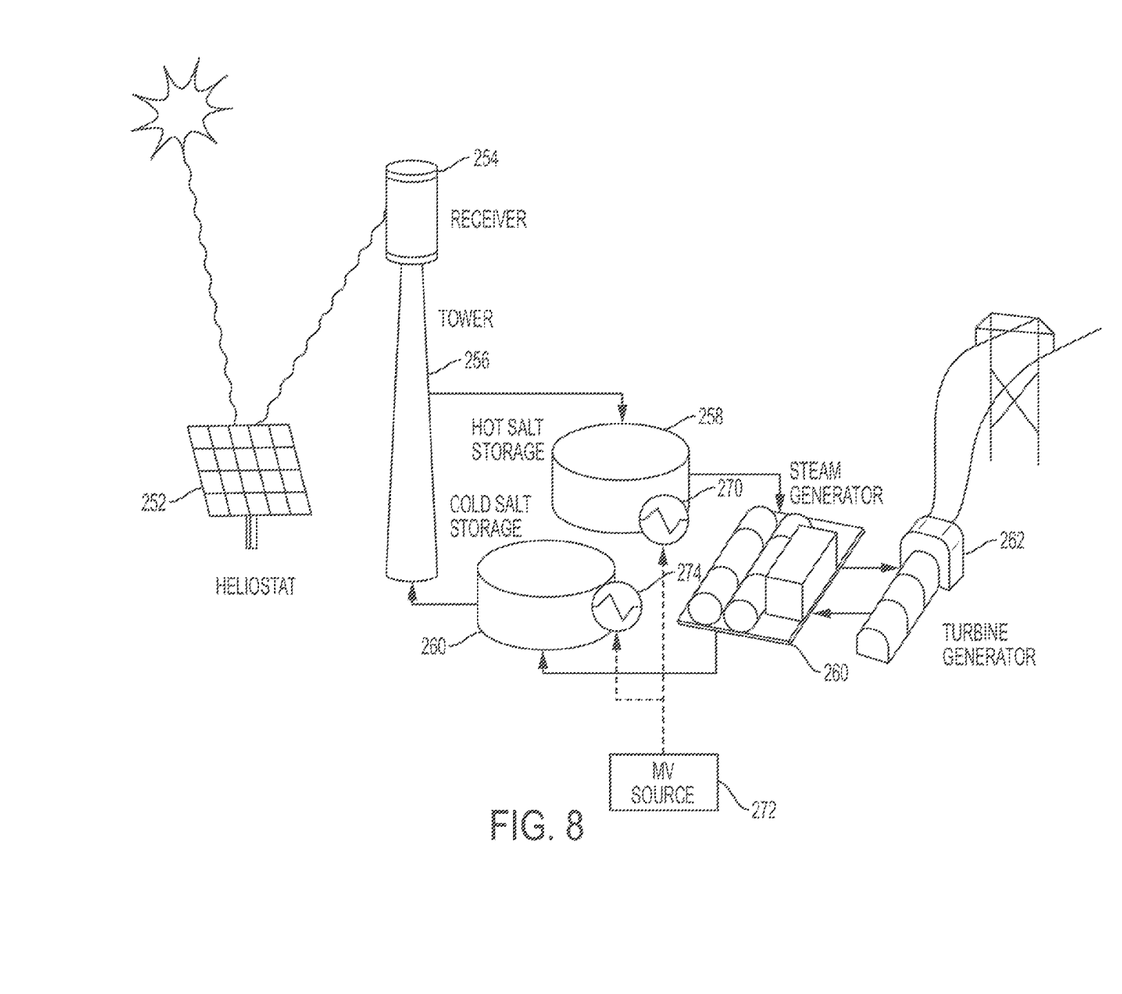
FIG. 8 illustrates a concentrated solar power energy storage system according to various embodiments of the present invention.

MV heaters could also be used in molten salt energy storage systems. FIG. 8 is a simplified diagram of a molten salt energy storage system 250. In such a system, sunlight is directed by heliostats 252 to a receiver 254 storing molten salt atop a tower 256. When the molten salt is solar heated to a sufficiently high temperature, e.g., around 570° C., it is stored in a hot salt storage tank 258. The hot molten salt can then be used as needed by a steam generator 260 to generate steam, which powers a turbine generator 262 to generate electricity. The cooled molten salt, at around 290° C., cooled from the steam generation process, is stored in a cold salt storage tank 264 and eventually returned to the receiver 254 to restart the process. At night, when the sun is not shining, a MV electrical heat exchanger 270 can be used to heat molten salt in the hot salt storage tank 258. Such a MV electrical heat exchanger 270 could be implemented as an immersion or circulation heater, and is powered by the MV source 272. The MV source 272 could be a renewable energy source, such as a wind power source, so that the wind energy could be used to heat the salt in the hot salt storage tank 258 during the night when it cannot be heated with solar energy. That way, the plant could start running sooner in the morning when the demand for electricity rises, even when the sun is not yet shining. Similarly, a MV electrical heat exchanger 274 could be used to heat the salt in the cold salt storage tank 260, again with voltage supplied by the MV source 272. That way, the salt in the receiver 254 will be warmer than without the MV electrical heat exchanger 274 in the cold salt storage tank 260, thereby reducing the time it takes the concentrated solar energy to heat the salt in the receiver 254 during the day to the desired temperature to run the generator 262.

Figure 9:
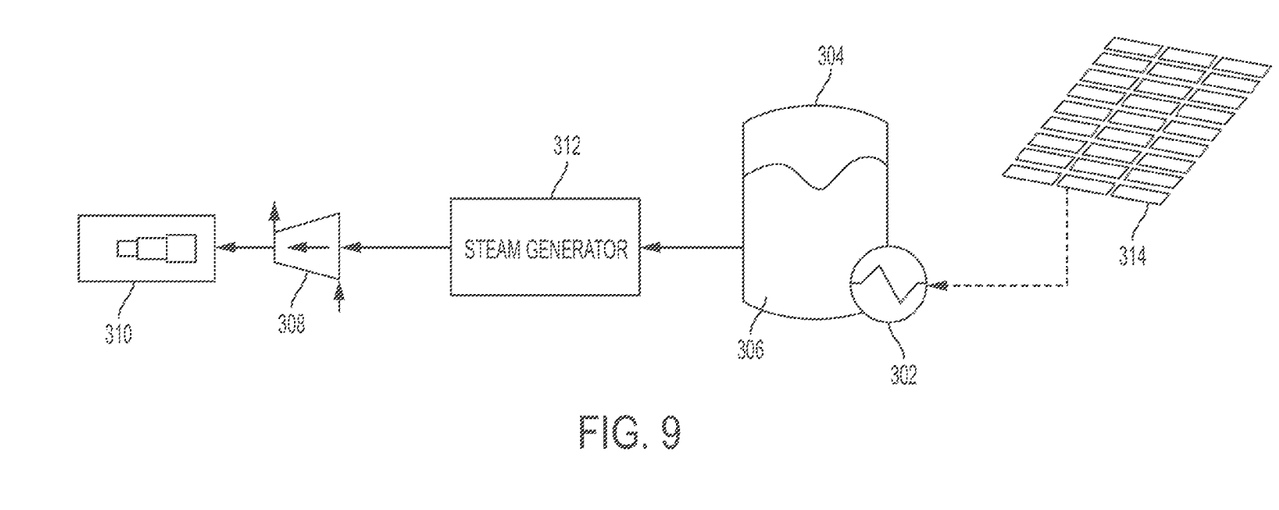
FIG. 9 illustrates a photovoltaic energy storage system according to various embodiments of the present invention.

FIG. 9 is a simplified block diagram of a photovoltaic energy system 300 that uses a MV electrical heat exchanger according to various embodiments of the present invention. In the illustrated embodiment, a storage tank 304 stores a fluid 306, such as water, oil, other phase-change materials, molten salt, etc. Where the fluid 306 is a phase-change material such as water/steam, the gas (e.g., steam) from the heated fluid can be used to drive a turbine 308 that drives an electricity generator 310. Where the fluid 306 is not a phase-change material (e.g., molten salt), the heated fluid 306 can be used to generate steam by a steam generator 312, that can be used to drive the turbine 308.

As shown in FIG. 9, the MV electrical heat exchanger 302 is powered with voltage from a photovoltaic panel(s) 314. Such a photovoltaic panel(s) 314 generates DC electricity, which is normally converted to AC in many applications. Here, however, the DC electricity from the photovoltaic panel(s) 314 does not need to be converted to AC as the MV electrical heat exchanger 302 can be powered by DC, thereby eliminating the need for an inverter. In other embodiments, however, the MV electrical heat exchanger 302 could be powered by AC, in which case an inverter (not shown) could be used to convert the DC power from the photovoltaic panel(s) 314 to AC to power the MV electrical heat exchanger 302.

A shortcoming of photovoltaic panels is the fast-changing nature of its output (e.g., due to passing clouds), which has a destabilizing effect on the power grid. Converting the electrical energy from the photovoltaic panel(s) 314 to heat with the MV electrical heat exchanger 302, as shown in FIG. 9, maintains the energy and tends to level its output. When the sun energy is lost due to clouds or night, the heat in the molten salt (or other fluid) 306 can continue to provide electrical power generation.

In general aspect, therefore, the present invention is directed to energy storage systems and methods. According to various embodiments, the energy storage system comprises a reservoir storing a fluid for heating (e.g., a tank or underground cavern) and a medium voltage electrical heat exchanger connected to the reservoir for heating the fluid. The medium voltage electrical heat exchanger comprises one or more medium voltage resistive heating elements, where each of the medium voltage resistive heating elements is driven with a voltage between 601 V and 69,000 V, inclusive. The energy system also comprises a turbine driven by the heated fluid (either directly or indirectly) and an electrical generator connected to the turbine for generating electricity. The energy system may further comprise a renewable energy source (e.g., a wind-powered renewable energy source) that supplies the voltage between 601 V and 69,000 V, inclusive, to the medium voltage resistive heating elements to heat the fluid.

In various implementations, as shown in FIG. 6, the reservoir 154 comprises compressed gas as the fluid, in which case the compressed gas from the reservoir 154 flows to the medium voltage electrical heat exchanger 182, whereupon the medium voltage electrical heat exchanger 182 heats the gas upon decompression of the gas, and the turbine 164 is powered by flow of the decompressed gas. Such an energy storage system may further comprise a compressor 152 for compressing the gas for storage in the reservoir 154; an auxiliary tank 158 for storing a second fluid to be heated, where the second fluid is heated with heat generated from compression of the gas by the compressor 152; and a second medium voltage electrical heat exchanger 186 for heating the second fluid in the auxiliary tank 158. Also, the second medium voltage electrical heat exchanger 186 may be powered by a renewable energy source 188, such as a wind-powered renewable energy source. The energy storage system may further comprise an additional heat exchanger 189 for heating the compressed gas prior to heating by the medium voltage electrical heat exchanger 182, where the additional heat exchanger 189 uses heat from the second medium in the auxiliary tank 158 to heat the compressed gas.

In other implementations, the reservoir is part of a pulverized coal-fired boiler 204, as shown in FIG. 7, or a first tank 258, 304 that stores molten salt as part of a molten salt energy storage system, as shown in FIGS. 8 and 9. In a molten salt energy storage system, as shown in FIG. 9, the medium voltage electrical heat exchanger 302 may be powered by one or more photovoltaic panels 314. This can also be done without converting the DC voltage from the photovoltaic panel(s) to AC voltage. In other molten salt energy storage system embodiments, as shown in FIG. 8, a concentrated solar power receiver 254 heats the molten salt and the first tank 258 stores the molten salt heated in the concentrated solar power receiver. The medium voltage electrical heat exchanger 270 is for heating the molten salt in the first tank 258. Also, the system may comprise a steam generator 260 for generating steam with the molten salt in the first tank, a second tank 260 for storing the molten salt after the molten salt is used to generate the steam, where the molten salt in the second tank 260 is fed to the concentrated solar power receiver 254 for solar heating, and a second medium voltage electrical heat exchanger 274 for heating the molten salt in the second tank 260. Again, the first and second medium voltage electrical heat exchangers 270, 274 may be powered by a wind-power energy system 272.

In one general aspect, the method for storing energy may comprise the steps of: (i) storing a fluid for heating in a reservoir (e.g., reservoirs 154, 204, 258 or 304); (ii) heating the fluid with a medium voltage electrical heat exchanger 182, 202, 270, 302 connected to the reservoir; (iii) driving, indirectly or directly, a turbine 164, 208, 262, 312 by the heated fluid; and (iv) generating electricity with an electrical generator 166, 210, 262, 310 that is connected to the turbine.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Although various embodiments have been described herein, many modifications, variations, substitutions, changes, and equivalents to those embodiments may be implemented and will occur to those skilled in the art. Also, where materials are disclosed for certain components, other materials may be used. It is therefore to be understood that the foregoing description and the appended claims are intended to cover all such modifications and variations as falling within the scope of the disclosed embodiments. The following claims are intended to cover all such modification and variations.

In summary, numerous benefits have been described which result from employing the concepts described herein. The foregoing description of the one or more embodiments has been presented for purposes of illustration and description. It is not intended to be exhaustive or limiting to the precise form disclosed. Modifications or variations are possible in light of the above teachings. The one or more embodiments were chosen and described in order to illustrate principles and practical application to thereby enable one of ordinary skill in the art to utilize the various embodiments and with various modifications as are suited to the particular use contemplated. It is intended that the claims submitted herewith define the overall scope.

What is claimed is:

1. An energy storage system comprising:
a reservoir storing a fluid for heating;
a medium voltage electrical heat exchanger connected to the reservoir for heating the fluid, wherein the medium voltage electrical heat exchanger comprises one or more medium voltage resistive heating elements, wherein each of the medium voltage resistive heating elements is driven with a voltage between 601 V and 69,000 V, inclusive;
a turbine driven by the heated fluid; and
an electrical generator connected to the turbine for generating electricity,
wherein the one or more medium voltage resistive heating elements each comprise:
an outer metal sheath;
a resistive wire; and
a dielectric core positioned within the outer metal sheath, wherein the dielectric core comprises:
a first series of two or more axially-aligned, outer tubular dielectric bodies positioned end-to-end; and
a second series of two or more axially-aligned, inner tubular dielectric bodies,
wherein:
the inner tubular dielectric bodies are positioned end-to-end in the sheath and are nested inside the outer tubular dielectric bodies;
the inner tubular dielectric bodies define an interior passageway and the resistive wire is positioned in the interior passageway; and
the inner tubular dielectric bodies are longitudinally staggered relative to the outer tubular dielectric bodies.

2. The energy storage system of claim 1, further comprising a renewable energy source that supplies the voltage between 601 V and 69,000 V, inclusive, to the medium voltage resistive heating elements of the medium voltage electrical heat exchanger to heat the fluid.

3. The energy storage system of claim 1, wherein:
the reservoir comprises compressed gas as the fluid; and
the compressed gas from the reservoir flows to the medium voltage electrical heat exchanger,
whereupon the medium voltage electrical heat exchanger heats the gas upon decompression of the gas; and
the turbine is powered by flow of the decompressed gas.

4. The energy storage system of claim 1, wherein:
the reservoir comprises a first tank; and
the fluid in the first tank comprises molten salt.

5. The energy storage system of claim 2, wherein the renewable energy source comprises a wind-powered renewable energy source.

6. The energy storage system of claim 3, further comprising:
a compressor for compressing the gas for storage in the reservoir;
an auxiliary tank for storing a second fluid to be heated, wherein the second fluid is heated with heat generated from compression of the gas by the compressor; and
a second medium voltage electrical heat exchanger for heating the second fluid in the auxiliary tank, wherein the second medium voltage electrical heat exchanger comprises one or more medium voltage heating elements, wherein each of the medium voltage resistive heating elements is driven with a voltage between 601 V and 69,000 V, inclusive.

7. The energy storage system of claim 3, wherein the reservoir comprises a tank.

8. The energy storage system of claim 3, wherein the reservoir comprises an underground cavern.

9. The energy storage system of claim 4, wherein the medium voltage electrical heat exchanger is powered by one or more photovoltaic panels.

10. The energy storage system of claim 4, further comprising a concentrated solar power receiver for heating the molten salt, and wherein:
the first tank stores the molten salt heated in the concentrated solar power receiver; and
the medium voltage electrical heat exchanger is for heating the molten salt in the first tank.

11. The energy storage system of claim 5, wherein the reservoir is part of a pulverized coal-fired boiler.

12. The energy storage system of claim 6, wherein the second medium voltage electrical heat exchanger is powered by a renewable energy source.

13. The energy storage system of claim 9, the medium voltage electrical heat exchanger is powered by DC voltage from the one or more photovoltaic panels without converting the DC voltage to AC voltage.

14. The energy storage system of claim 10, further comprising:
a steam generator for generating steam with the molten salt in the first tank;
a second tank for storing the molten salt after the molten salt is used to generate the steam,
wherein the molten salt in the second tank is fed to the concentrated solar power receiver for solar heating; and
a second medium voltage electrical heat exchanger for heating the molten salt in the second tank, wherein the second medium voltage electrical heat exchanger comprises one or more medium voltage resistive heating elements, wherein each of the medium voltage resistive heating elements is driven with a voltage between 601 V and 69,000 V, inclusive.

15. The energy storage system of claim 12, wherein the renewable energy source comprises a wind-powered renewable energy source.

16. The energy storage system of claim 15, further comprising an additional heat exchanger for heating the compressed gas prior to heating by the medium voltage electrical heat exchanger, wherein the additional heat exchanger uses heat from the second medium to heat the compressed gas.

17. The energy storage system of claim 14, wherein the first and second medium voltage electrical heat exchangers are powered by a wind-power energy system.

18. A method for storing energy comprising:
storing a fluid for heating in a reservoir;
heating the fluid with a medium voltage electrical heat exchanger connected to the reservoir, wherein the medium voltage electrical heat exchanger comprises one or more medium voltage resistive heating elements, wherein each of the medium voltage resistive heating elements is driven with a voltage between 601 V and 69,000 V, inclusive, and wherein the one or more medium voltage resistive heating elements each comprise:
an outer metal sheath;
a resistive wire; and
a dielectric core positioned within the outer metal sheath, wherein the dielectric core comprises:
a first series of two or more axially-aligned, outer tubular dielectric bodies positioned end-to-end; and
a second series of two or more axially-aligned, inner tubular dielectric bodies,
wherein:
the inner tubular dielectric bodies are positioned end-to-end in the sheath and are nested inside the outer tubular dielectric bodies;
the inner tubular dielectric bodies define an interior passageway and the resistive wire is positioned in the interior passageway; and
the inner tubular dielectric bodies are longitudinally staggered relative to the outer tubular dielectric bodies;
driving a turbine by the heated fluid; and
generating electricity with an electrical generator that is connected to the turbine.

19. The method of claim 18, further comprising powering the medium voltage electrical heat exchanger with a renewable energy source that supplies the voltage between 601 V and 69,000 V, inclusive, to the medium voltage resistive heating elements of the medium voltage electrical heat exchanger to heat the fluid.

20. The method of claim 18, wherein:
the reservoir comprises compressed gas as the fluid; and
the compressed gas from the reservoir flows to the medium voltage electrical heat exchanger, whereupon the medium voltage electrical heat exchanger heats the gas upon decompression of the gas; and
the turbine is powered by flow of the decompressed gas.

21. The method of claim 18, wherein storing the fluid for heating in a reservoir comprises storing molten salt in a reservoir that comprises a first tank.

22. The method of claim 19, wherein the renewable energy source comprises a wind-powered renewable energy source.

23. The method of claim 20, further comprising:
compressing the gas for storage in the reservoir with a compressor;
storing a second fluid to be heated in an auxiliary tank, wherein the second fluid is heated with heat generated from compression of the gas by the compressor; and
heating the second fluid in the auxiliary tank with a second medium voltage electrical heat exchanger, wherein the second medium voltage electrical heat exchanger comprises one or more medium voltage heating elements, wherein each of the medium voltage resistive heating elements is driven with a voltage between 601 V and 69,000 V, inclusive.

24. The method of claim 21, further comprising powering the medium voltage electrical heat exchanger with one or more photovoltaic panels.

25. The method of claim 21, further comprising heating the molten salt in a concentrated solar power receiver for, and wherein:
the first tank stores the molten salt heated in the concentrated solar power receiver; and
the medium voltage electrical heat exchanger is for heating the molten salt in the first tank.

26. The method of claim 23, wherein the second medium voltage electrical heat exchanger is powered by a wind-powered renewable energy source.

27. The method of claim 25, further comprising:
generating steam by a steam generator using the molten salt in the first tank;
storing the molten salt in a second tank after the molten salt is used to generate the steam, wherein the molten salt in the second tank is fed to the concentrated solar power receiver for solar heating; and
heating the molten salt in the second tank with a second medium voltage electrical heat exchanger, wherein the second medium voltage electrical heat exchanger comprises one or more medium voltage resistive heating elements, wherein each of the medium voltage resistive heating elements is driven with a voltage between 601 V and 69,000 V, inclusive.

28. The method of claim 26, further comprising heating the compressed gas with an additional heat exchanger for prior to heating by the medium voltage electrical heat exchanger, wherein the additional heat exchanger uses heat from the second medium to heat the compressed gas.

29. The method of claim 27, further comprising powering the first and second medium voltage electrical heat exchangers with a wind-power energy system.

* * * * *